(12) United States Patent
Satoh

(10) Patent No.: US 7,971,153 B2
(45) Date of Patent: Jun. 28, 2011

(54) WEATHER INFORMATION DISPLAY APPARATUS AND PROGRAM

(75) Inventor: Taichi Satoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 804 days.

(21) Appl. No.: 12/000,801

(22) Filed: Dec. 18, 2007

(65) Prior Publication Data

US 2008/0163105 A1 Jul. 3, 2008

(30) Foreign Application Priority Data

Dec. 27, 2006 (JP) ................................. 2006-352740

(51) Int. Cl.
*G06F 3/048* (2006.01)
*G08G 1/123* (2006.01)
*G09G 5/00* (2006.01)
(52) U.S. Cl. ...................... 715/790; 715/766; 340/995.1; 340/995.14; 345/637
(58) Field of Classification Search .................. 715/790, 715/764, 766, 781, 788; 340/995.1, 995.11, 340/995.12, 995.14; 345/637
See application file for complete search history.

(56) References Cited

U.S. PATENT DOCUMENTS

| 2,808,671 | A | 12/1955 | Smith et al. | |
| 4,783,648 | A | 11/1988 | Homma et al. | |
| 5,739,772 | A * | 4/1998 | Nanba et al. | 340/990 |
| 2006/0178818 | A1 | 8/2006 | Dhollande | |
| 2006/0217883 | A1 | 9/2006 | Nomura | |
| 2006/0277495 | A1* | 12/2006 | Obradovich | 715/790 |
| 2007/0049260 | A1 | 3/2007 | Yuhara et al. | |

FOREIGN PATENT DOCUMENTS

| EP | 1 280 067 | 1/2003 |
| JP | A-63-020525 | 1/1988 |
| JP | A-7-105491 | 4/1995 |
| JP | A-7-175410 | 7/1995 |
| JP | A-9-097345 | 4/1997 |
| JP | A-2000-002550 | 1/2000 |
| JP | A-2000-121377 | 4/2000 |
| JP | A-2000-193469 | 7/2000 |
| JP | A-2000-305549 | 11/2000 |
| JP | A-2001-317955 | 11/2001 |
| JP | A-2002-131068 | 5/2002 |
| JP | A-2003-263102 | 9/2003 |
| JP | A-2003-307574 | 10/2003 |
| JP | A-2004-069469 | 3/2004 |
| JP | A-2004-069561 | 3/2004 |
| JP | A-2004-144721 | 5/2004 |

OTHER PUBLICATIONS

Garmin Owner's Manual for GPSMAP 392/398 GPSMAP 492/498, Part No. 190-00653-00 Rev. C, Sep. 2006, pp. 45-56 and 74-78.*

(Continued)

*Primary Examiner* — Weilun Lo
*Assistant Examiner* — Dino Kujundzic
(74) *Attorney, Agent, or Firm* — Posz Law Group, PLC

(57) ABSTRACT

A weather information display apparatus comprising a map information retrieving device, a weather information retrieving device, a display device, a command receiving device, and a display controlling device. Each of weather information sets has a predetermined display priority. When a first region of a map associated with first weather information overlaps with a second region associated with second weather information via an overlapped section, the display controlling device controls a display condition of the overlapped section such that the overlapped section is displayed under the display condition associated with the first weather information. Here, the first information has the display priority higher than that of the second information. When the display controlling device receives a certain command, the display controlling device controls the display condition of the overlapped section such that the overlapped section is temporarily displayed under the display condition associated with the second weather information.

14 Claims, 5 Drawing Sheets

OTHER PUBLICATIONS

Office Action dated Jul. 26, 2010 issued in corresponding DE application No. 10 2007 061 461.8.
Examination Report dated Sep. 21, 2010 issued in corresponding GB application No. GB0725031.9.
Search Report dated Apr. 16, 2008 in corresponding Great Britain patent application No. GB0725031.9.
Office Action mailed Mar. 15, 2011 issued in corresponding Japan patent application No. 2006-352740 (English translation enclosed).

* cited by examiner

| DISPLAY PRIORITY | TYPE | DISPLAY CONDITION |
|---|---|---|
| 1 | WEATHER INFO. A | a |
| 2 | WEATHER INFO. B | b |
| 3 | WEATHER INFO. C | c |
| 4 | WEATHER INFO. D | d |
| 5 | WEATHER INFO. E | e |
| 6 | WEATHER INFO. F | f |
| 7 | WEATHER INFO. G | g |
| ... | ... | ... |

WEATHER INFORMATION DISPLAY APPARATUS AND PROGRAM

CROSS REFERENCE TO RELATED APPLICATION

This application is based on and incorporates herein by reference Japanese Patent Application No. 2006-352740 filed on Dec. 27, 2006.

BACKGROUND OF THE INVENTION

1. Field of the Invention

The present invention relates to a weather information display apparatus that displays weather information superimposed on a map and a program thereof.

2. Description of Related Art

JP-A-2000-193469 describes art for superimposing weather information along a route and a destination on a map such that the weather information is obtained as an effective material for understanding a situation, for selecting a destination, or for determining a travel route.

However, JP-A-2000-193469 does not disclose a method for displaying weather information sets overlapped with each other. The invention disclosed in JP-A-2000-193469 is basically intended only to the weather information as a meteorological condition, such as clear, rainy, cloudy, which is usually not overlapped with each other the same region. As a result, it is natural that JP-A-2000-193469 does not disclose or suggest any idea relating to a method for displaying multiple types of weather information sets that are overlapped with one another in the same region.

SUMMARY OF THE INVENTION

The present invention is made in view of the above disadvantages. Thus, it is an objective of the present invention to address at least one of the above disadvantages.

To achieve the objective of the present invention, there is provided a weather information display apparatus, which includes map information retrieving means, weather information retrieving means, display means, command receiving means, and display controlling means. The map information retrieving means retrieves map information of a map. The weather information retrieving means retrieves a plurality of weather information sets, each of which is associated with at least one of sections of the map. The display means displays information to a user. The command receiving means receives a command from the user. The display controlling means causes the display means to display the map based on the map information retrieved by the map information retrieving means. The display controlling means controls a display condition of one section of the sections associated with one of the weather information sets and a display condition of another section of the sections associated with another one of the weather information sets such that the one section is distinguishable from the another section. Each of the weather information sets has a predetermined display priority. When a first region having two or more of the sections associated with a first one of the weather information sets overlaps with a second region having two or more of the sections associated with a second one of the weather information sets via an overlapped section, the display controlling means controls the display condition of the overlapped section such that the overlapped section is displayed under the display condition associated with the first one of the weather information sets. Here, the first one has the display priority higher than that of the second one. The display controlling means causes the display means to display information that indicates an existence of the overlapped section. When the display controlling means receives a certain command via the command receiving means, the display controlling means controls the display condition of the overlapped section such that the overlapped section is temporarily displayed under the display condition associated with the second one of the weather information sets.

To achieve the objective of the present invention, there is also provided a weather information display apparatus, which includes map information retrieving means, weather information retrieving means, display means, command receiving means, and display controlling means. The map information retrieving means retrieves map information of a map. The weather information retrieving means retrieves a plurality of weather information sets, each of which is associated with at least one of sections of the map. The display means displays information to a user. The command receiving means receives a command from the user. The display controlling means causes the display means to display the map based on the map information retrieved by the map information retrieving means. Here, the display controlling means controls a display condition of one section of the sections associated with one of the weather information sets and a display condition of another section of the sections associated with another one of the weather information sets such that the one section is distinguishable from the another section. Each of the weather information sets has a predetermined display priority. When the sections of the map includes an overlapped section that is associated with a first one and a second one of the weather information sets, the display controlling means controls the display condition of the overlapped section such that the overlapped section is displayed under the display condition associated with the first one of the weather information sets. Here, the first one has the display priority higher than that of the second one. The display controlling means causes the display means to display information that indicates an existence of the overlapped section. When the display controlling means receives a certain command via the command receiving means, the display controlling means controls the display condition of the overlapped section such that the overlapped section is temporarily displayed under the display condition associated with the second one of the weather information sets.

To achieve the objective of the present invention, there is also provided an article manufacture comprising a computer readable medium readable by a computer and program instructions carried by the computer readable medium for causing the computer to serve as the display controlling means of the above weather information display apparatus.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One embodiment of the present invention is described below with reference to accompanying drawings.

A structure of a navigation system is described.

Figure 1:
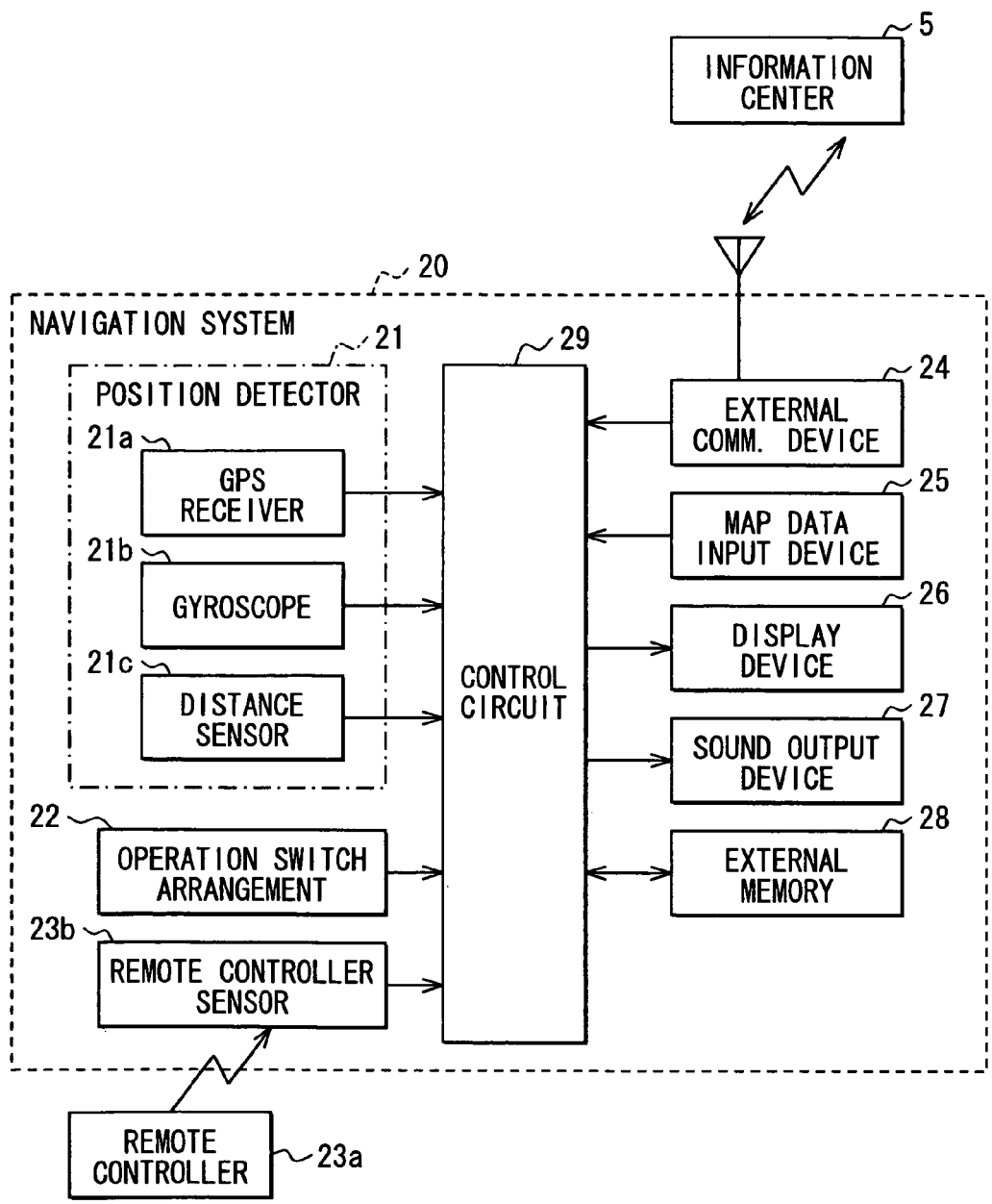
FIG. 1 is an explanatory diagram showing a schematic structure of a navigation system of one embodiment of the present invention.

FIG. 1 is a block diagram showing a schematic structure of a navigation system 20, into which function of a weather information display apparatus of the present invention is incorporated.

The navigation system 20 includes a position detector 21, an operation switch arrangement 22, a remote control terminal (indicated as a remote controller) 23a, a remote controller sensor 23b, an external communication device 24, a map data input device 25, a display device 26, a sound output device 27, an external memory 28, and a control circuit 29. The position detector 21 is mounted on a vehicle for detecting a position, a speed and a traveling direction of the vehicle. The operation switch arrangement 22 is used for inputting various commands by a user. The remote controller 23a is also used for inputting various commands similar to the operation switch arrangement 22. The remote controller sensor 23b is used to input a signal from the remote controller 23a. The external communication device 24 communicates with an external information center 5. The map data input device 25 inputs map data from an external storage medium that stores the map data and various information sets. The display device 26 performs various display operations, such as a display operation for displaying the map. The sound output device 27 is configured to output various guidance voices. The external memory 28 is connected with the control circuit 29 for storing various information sets.

The position detector 21 includes a GPS receiver 21a, a gyroscope 21b, and a distance sensor 21c. The GPS receiver 21a receives transmission waves from GPS (Global Positioning System) satellites via a GPS antenna for detecting a position, a speed, and a traveling direction of a vehicle. The gyroscope 21b senses a magnitude of a rotational motion that is applied to the vehicle. The distance sensor 21c detects a travel distance of the vehicle. Because each of the above sensors 21a to 21c has own error of a different kind, the sensors 21a to 21c are configured to complement one another. Note that, depending on a required accuracy, only part of the above sensors may be employed, and alternatively, a rotation angle sensor of a steering wheel or a wheel sensor of a traveling wheel may be employed.

The operation switch arrangement 22 includes a touch sensitive panel and mechanical key switches. The touch sensitive panel is integral with the display device 26 and is provided in a display screen and the mechanical key switches are provided around the display device 26. It is noted that the touch sensitive panel is integrally laminated on the display device 26, and the touch sensitive panel may employ a pressure sensitive type, an electromagnetic induction type, an electrical capacitance type, or a combination of any of the above types.

Because the external communication device 24 communicates information with the external information center 5, the external communication device 24 receives weather information delivered by FM multiplex broadcasting or radio/optical beacon from the information center 5. Alternatively, the external communication device 24 may be configured to receive the weather information from the information center 5 via a telephone network, such as the Internet.

The map data input device 25 inputs various data sets stored in a map data storage medium not shown (e.g., hard disk, DVD-ROM). The map data storage medium stores map data (node data, link data, cost data, background data, road data, name data, mark data, junction data, facility data) as map information, voice data for guidance, and voice recognition data. Note that, the above data sets may be alternatively inputted through a communication network instead of inputting the above data sets from the map data storage medium.

The display device 26 is a color display device, and may employ any one of a liquid crystal display, a plasma display, and a CRT. The display screen of the display device 26 can display a mark indicative of a current position, a guided route to a destination, and additional data all superimposed onto one another. Here, the current position indicated by the mark is specified based on a present position of the vehicle detected by the position detector 21 and based on the map data inputted through the map data input device 25. Also, the additional data may be names, landmarks, symbol marks of various facilities. Also, as described later, a display condition for displaying one section in the map is differentiated from that for displaying another section in the map such that such that the one section having corresponding weather information can be distinguished from the another section having another corresponding weather information (see FIG. 4B, FIGS. 5A to 5B).

The sound output device 27 is configured to output sound of various guidance sets, such as travel guidance.

The control circuit 29 is made of a well-known microcomputer having a CPU, a ROM, a RAM, an I/O and bus line connecting the above components of the microcomputer. The control circuit 29 executes various processes in accordance with inputs from the position detector 21, the operation switch arrangement 22, the remote controller sensor 23b, the external communication device 24, and the map data input device 25 such that the external communication device 24 controls the external communication device 24, the display device 26, and the sound output device 27. The control circuit 29 executes various processes in accordance with programs stored in the ROM by using data stored in the external memory 28 as necessary.

For example, processes relating to the navigation include a map display process and a route guidance process. The map display process computes the present position of the vehicle as a combination of a coordinate and a traveling direction based on each detection signal sent from the position detector 21, and also displays the map in the vicinity of the present position retrieved from the map data input device 25 in the display device 26. Also, the route guidance process computes an optimum route from the present position to the destination based on point data stored in the map data input device 25 and based on the destination determined by the operation of the operation switch arrangement 22 and the remote controller 23a. Then, the travel guidance is performed for the computed route. Here, a cost computation method by Dijkstra method is well known as a method for automatically determining the optimum route.

Also, the control circuit 29 executes a display process for displaying the weather information in parallel with the above map display process and the above route guidance process. Note that, the display process is detailed later.

As described above, the navigation system 20 obtains the weather information from the information center 5 via the external communication device 24. The information center 5 is described below.

The information center 5 is connected with a radio base station, which is contactable with each vehicle, through a communication line, and performs radio communication with the navigation system 20 via the radio base station to transmit the weather information to the navigation system 20. Specifically, the information center 5 includes a weather information database, a line terminal device, a data server (all not shown). The weather information database stores the weather information sets, which are to be transmitted to the navigation system 20. The line terminal device performs communication via the communication line, and the data server manages data.

Figures 4A, 4B:
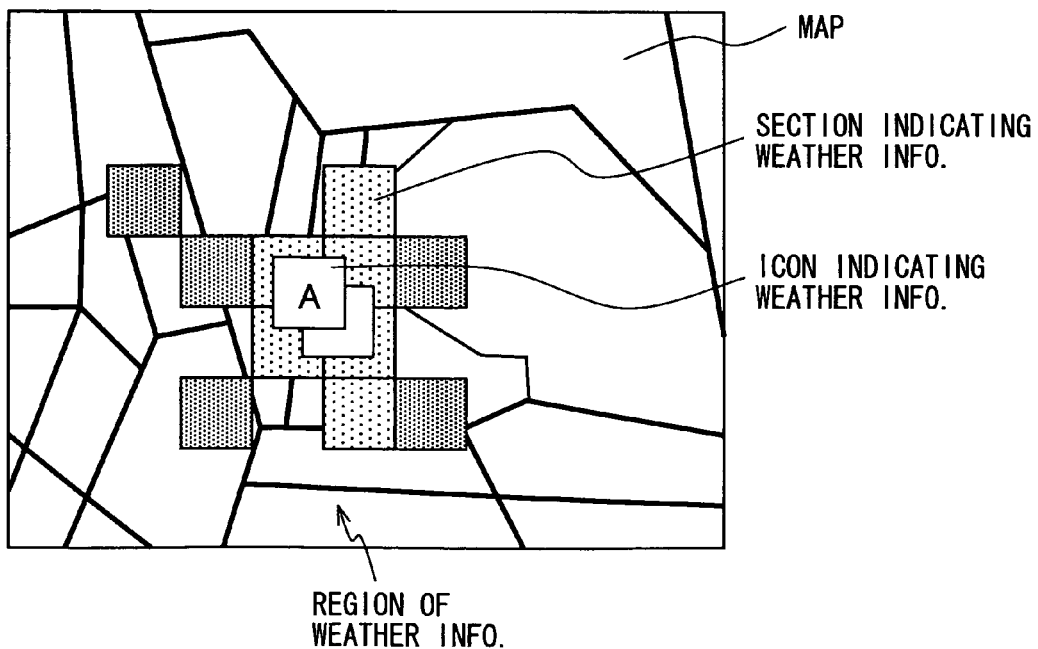
FIG. 4A is a table showing a correspondence relation between kinds of a type of weather information, a display priority, and a display condition.
FIG. 4B is an explanatory diagram showing a display example of the weather information.

The weather information database stores regional weather information sets, which are obtained based on information acquired as necessary from an organization that provides weather observation information. The weather information sets are stored correspondingly to each of certain sections of the map. For example, each of the weather information sets is associated with at least one of the certain sections of the map. The certain section may be, for example, a mesh section defined by a latitude and a longitude, or a section divided by a government. In the present embodiment, as shown in FIG. 4B, the mesh section defined by the latitude and the longitude is employed as an example. Also, the weather information sets stored in the weather information database may include weather warning (e.g., tornado, flood), present/forecast information (e.g., clear, rain, lightning, storm), and road information (e.g., freeze, submergence). As above, the stored weather information sets generally include data relating to tornado, thunderstorm, typhoon, rain, fog, sleet, snow, and hail.

In the navigation system 20 of the present embodiment, a process for displaying the weather information on the display device 26 is described with reference to flow charts shown in FIG. 2 and FIG. 3, and diagrams shown in display examples in FIGS. 4A, 4B, 5A, 5B, 5C.

Weather information display process is described.

Figure 2:
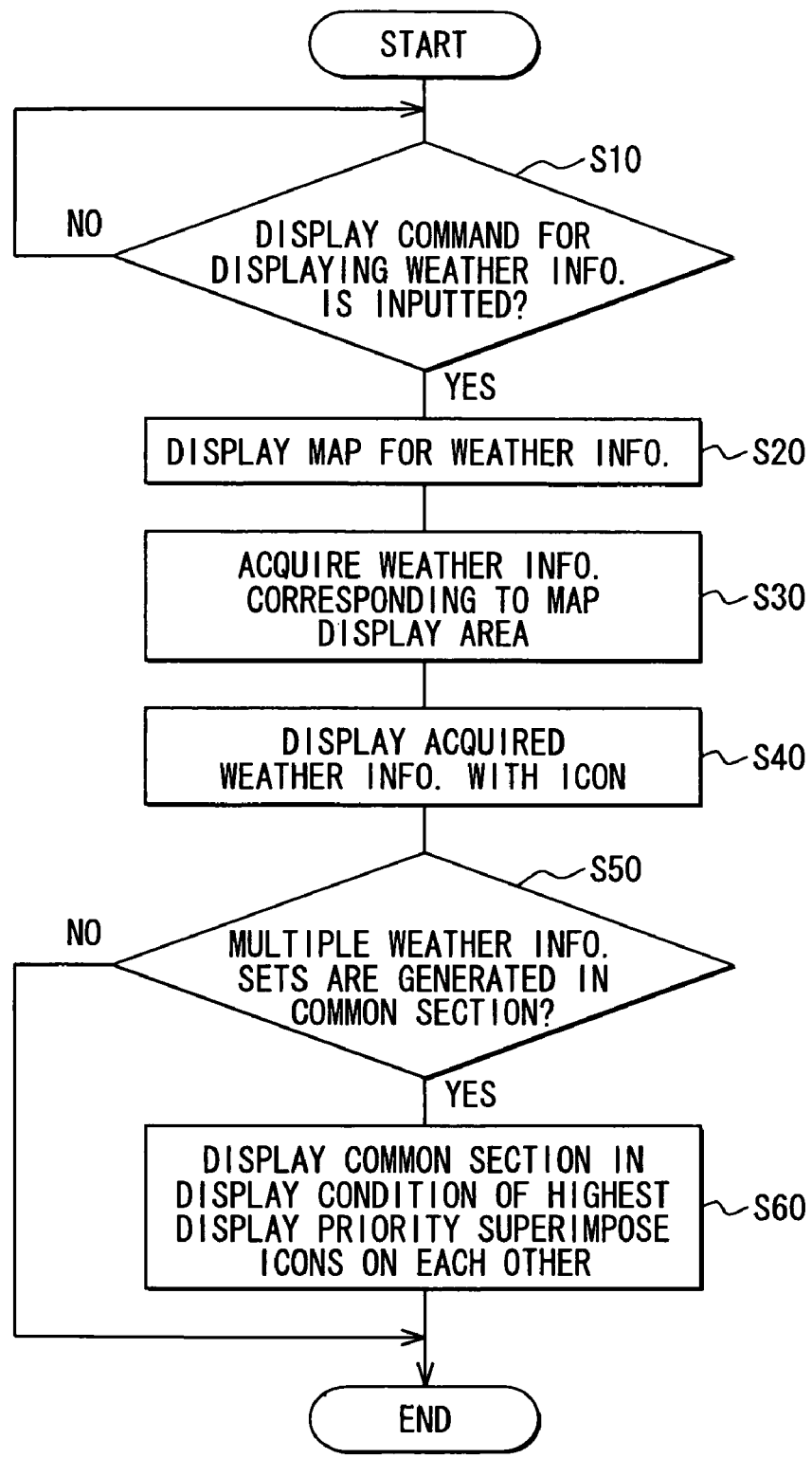
FIG. 2 is a flow chart showing a procedure of an initial display process of weather information executed by a control circuit of the navigation system.

FIG. 2 is a flow chart showing a procedure of an initial display process for initially displaying the weather information executed by the control circuit 29 of the navigation system 20.

Firstly, it is determined at S10 whether or not a command (display command) for starting the display process for displaying the weather information is inputted by a user via the operation switch arrangement 22 or the remote controller 23a. When the display command is inputted (YES at S10), control proceed to S20.

At S20, a display map used for displaying the weather information is displayed. For example, the display map may be a map of a certain area around the position of the own vehicle of the user, or a map of another certain area specified by the user. Also, the display map for displaying the weather information is a map specialized for displaying the weather information, and thereby does not display the guided route in route guidance, surrounding facility information, or landmarks.

Then, the weather information that corresponds to an area of the display map (i.e., map display area) displayed at S20 is obtained (i.e., acquired). Various methods for obtaining the weather information may be considered, but in the present embodiment, three examples below are described.

(1) For example, if the weather information is transmitted in a broadcast format of the FM multiplex broadcasting, satellite radio broadcasting, or digital radio broadcasting, the weather information is received and is stored in the external memory 28. Whenever the weather information is updated, the weather information stored in the external memory 28 is also updated. Then, the weather information that corresponds to the map display area can be obtained from the weather information stored in the external memory 28 at S30.

(2) For example, the communication with the information center 5 via the external communication device 24 is started and performed after the process at S30 is started. Then, transmission of the weather information stored in the information center 5 is requested, and the weather information transmitted from the information center 5 upon the request is received and stored in the external memory 28. Then, the weather information corresponding to the map display area is obtained from the weather information stored in the external memory 28.

At the present example, the information center 5 transmits the weather information stored in the weather information database at the moment to the navigation system 20 upon the request by the navigation system 20.

(3) In the above examples (1), (2), the weather information that corresponds to the map display area is extracted in the navigation system 20. However, the information center 5 may alternatively execute the above extraction operation. In the above example, the navigation system 20 communicates with the information center 5 via the external communication device 24, and the navigation system 20 transmits the map display area to the information center 5 simultaneously with the request of the transmission of the weather information that corresponds to the map display area. Then, the navigation system 20 receives the weather information transmitted from the information center 5 upon the request.

In the present example, the information center 5 extracts the weather information that corresponds to the map display area, which is transmitted from the navigation system 20, among the weather information sets stored in the weather information database at the moment in accordance with the request by the navigation system 20. Then, the information center 5 transmits the extracted weather information to the navigation system 20.

When the weather information is obtained at S30, control proceeds to S40. At S40, the obtained weather information is displayed with an icon.

FIG. 4A is described here. FIG. 4A is a table showing a correspondence relation between (a) a type of weather information and (b) a display priority and a display condition. For example, the table is stored in the external memory 28. In the correspondence relation table, types A, B, C, etc of the weather information are set correspondingly to the display priorities 1, 2, 3, etc and correspondingly to the display conditions a, b, c, etc. Each display condition shows, for example, color or a texture pattern such that the difference of the weather information can be distinguished in accordance with the difference of the color or the texture pattern of the displayed information.

At S40, a section corresponding to the weather information is displayed under the display condition that corresponds to the weather information with reference to the correspondence relation table. Also, for example, a letter (word) or a mark that indicates the weather information may be employed as the icon indicating the weather information. For example, a word "tornado" may be displayed, or alternatively, a mark having an image of the tornado may be displayed.

At S50, it is determined whether or not multiple kinds of weather information sets are generated in the same section (i.e., whether or not there is an overlapped section that is associated with multiple kinds of weather information sets).

Figure 5A:
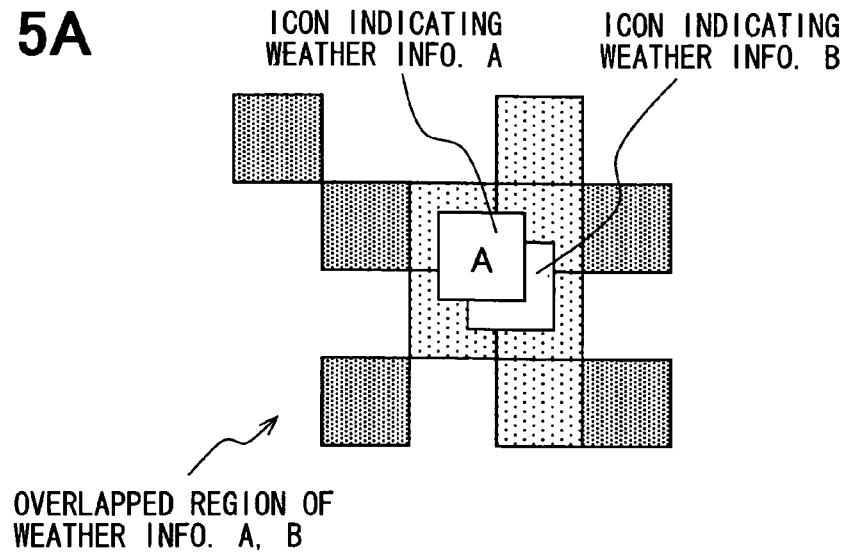
FIGS. 5A to 5C are explanatory diagrams each showing a state, where a display of the weather information is changed.

In other words, it is determined whether or not one region of at least one of the multiple kinds of weather information sets overlaps with another region of another one of the multiple kinds of weather information sets overlapping via the overlapped section. Here, the overlapped section is a common section shared by the one region and the another region. Also, "region of the weather information" includes multiple sections that are associated with the weather information of the same kind. For example, six sections indicating the weather information A in FIG. 5B define a region of the weather information A. In FIG. 5C, nine sections indicating the weather in formation B define a region of the weather information B, for example. In this way, as shown in FIG. 5A, central four sections, in which icons indicating the weather information sets A, B are superimposed on one another, are associated with both the weather information A and the weather information B, for example. When the multiple kinds of weather information sets are generated in the same section (i.e., overlapped section) (YES at S50), the overlapped section is displayed under the display condition that corresponds to one of the weather information sets in the section having the highest display priority among the weather information sets, and icons are superimposed on one another at S60.

Typically, at S60, with reference to the correspondence relation table shown in FIG. 4A, the display priority of each weather information in the overlapped section is compared with each other such that the display condition corresponding to the weather information having the highest display priority is determined. For example, if the weather information A and the weather information B are generated in the same section, the section for the weather information sets A, B is displayed under the display condition of the weather information A, and the icon of the weather information A is superimposed on the icon of the weather information B with a certain amount of displacement relative to each of the icons, for example, as shown in FIG. 4B. After the process at S60, the initial display process is ended.

In contrast, when the multiple kinds of weather information sets are not generated in the same section (NO at S50), the process at S60 is not executed, and the initial display process is ended.

Figure 3:
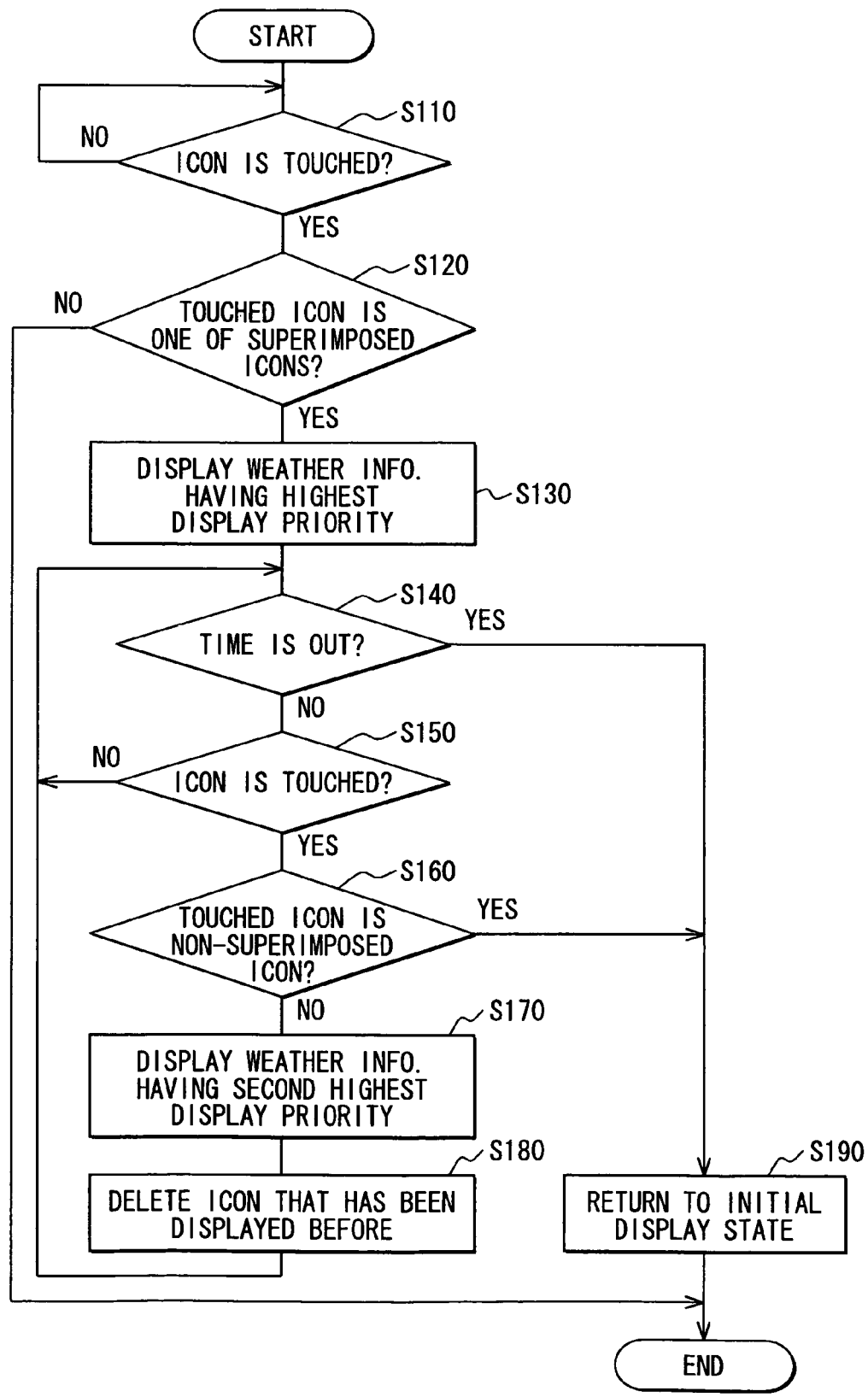
FIG. 3 is a flow chart showing a procedure of a display switch process of the weather information executed by the control circuit of the navigation system.

FIG. 3 is a flow chart showing a procedure of a display switch process for switching a display of the weather information executed by the control circuit 29 of the navigation system 20. The display switch process is executed after the initial display process shown in FIG. 2 has been executed.

As described above, the touch sensitive panel, which is formed integrally with the display device 26, and which is provided on the display screen, serves as the operation switch arrangement 22. It is determined at S110 whether or not a portion displaying the icon in the screen is touched (i.e., whether the icon is touched), and when the icon is touched (YES at S110), control proceeds to S120.

At S120, it is determined whether the touched icon that is touched corresponds to one of the superimposed icons. When the one of the superimposed icons is not touched (NO at S120), processes at S130 and after are not executed, and the display switch process is ended. In contrast, when the one of the superimposed icons is touched (YES at S120), control proceeds to S130, and only the weather information having the highest display priority among the overlapped whether information sets is displayed (see FIG. 5B). In the present case, the icons are displayed in the same manner as before.

At S140, it is determined whether or not time is out. When time is not out (NO at S140), control proceeds to S150, where it is determined whether or not the icon is touched. When the icon is not touched (NO at S150), control returns to S140.

That is, when a certain period has elapsed in a state, where the icon has not been touched, time is out (YES at S140), and control proceeds to S190. At S190, the display state is returned to the initial display state (see FIG. 5A), and the display switch process is ended. Note that, a period for determining the time out at S140 is, for example, 5 seconds.

In contrast, if the icon is touched (YES at S150) before the time becomes out (NO at S140), control proceeds to S160. At S160, it is determined whether the touched icon is a non-superimposed icon, and when one of the multiple superimposed icons is touched (NO at S160), control proceeds to S170. In other words, when a part of the display screen, which part has the multiple superimposed icons, is touched, control proceeds to S170.

At S170, the sections for the weather information having the second highest display priority are exclusively displayed, and at S180, the icon of the weather information that has been displayed before is deleted (e.g., the icon of the weather information A is deleted, see FIG. 5C).

When only one icon is touched (YES at S160), control proceeds to S190, where the display is returned to the initial display state (see FIG. 5A).

Here, an example of a specific switching of the display by the display switch process shown in FIG. 3 is described with reference to FIGS. 5A to 5C. FIG. 5A shows an initial display state, where a region of the weather information A is superimposed with at least a part of a region of the weather information B. Due to the initial display process shown in FIG. 2, when the weather information A and the weather information B are both generated in the same section, the section is displayed under the display condition of the weather information A, and the icon of the weather information A is superimposed on the icon of the weather information B, and simultaneously, both the icons are displaced by a certain amount relatively from each other.

In the above state, if one of the superimposed the icons is touched (YES at S110, YES at S120), the process at S130 exclusively displays the region of the weather information A. However, the icons are the same as before (e.g., the initial display state). As a result, the display becomes a state shown in FIG. 5B.

In the above state, the icon is further touched (YES at S150, NO at S160), the process at S170 exclusively displays the region of the weather information B, and the process at S180 deletes the icon of the weather information A. As a result, the region and the icon of the weather information B are displayed as shown in FIG. 5C.

After the process at S180 is executed, control returns to S140, and the processes at S140 and after are repeated. For example, in a state, where only the region and the icon of the weather information B as shown in FIG. 5C, if the icon is touched (YES at S150), the determination indicates YES at S160. Thus, control proceeds to S190, and the display returns to the initial display state shown in FIG. 5A.

Figure 5B:
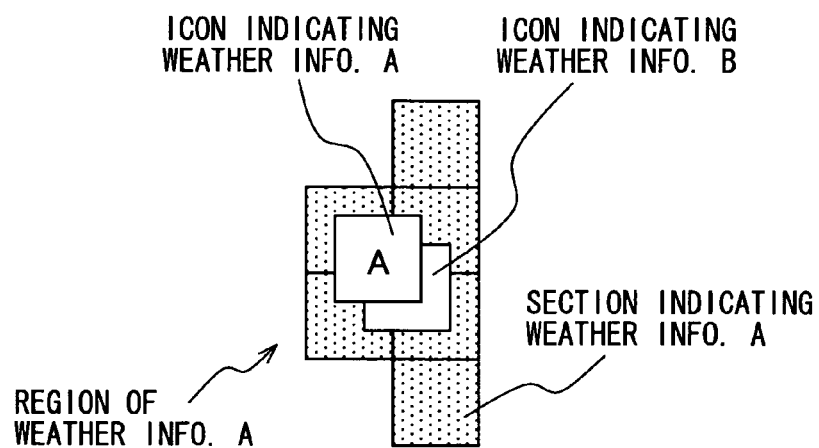
Figure 5C:
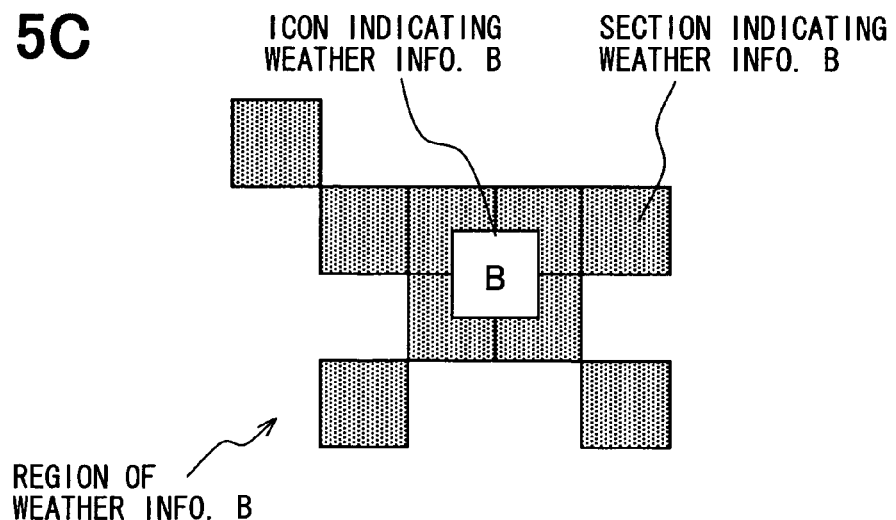

Note that, the examples in FIGS. 5A to 5C show a state, where the weather information A, B of two different kinds are overlapped with each other. In a state, where three or more sets of weather information are overlapped with each other, every time the icons are touched, a section corresponding to the weather information having the higher display priority is displayed sequentially in a descending order of the display priority of the weather information (i.e., in the order of the weather information sets A, B, C, as the display priority shown in FIG. 4A indicates, for example).

Advantages will be described.

(1) The display condition of each section displayed in the map is controlled such that one section associated with one of the weather information sets can be distinguished from another section associated with another one of the weather information sets. Thus, the user can tell weather state of each region of the map. Here, the one of the weather information sets and the another the one of the weather information sets are set correspondingly to each section in the map.

(2) When the multiple kinds of weather states (weather information sets) are generated in the same region (i.e., sections), it is controlled that the overlapped sections be displayed under the display condition of the weather information having the highest display priority among the multiple kinds of weather information sets. Thus, the user is limited from missing the weather information having the higher display priority. Here, each of the multiple weather information sets is preset with a corresponding display priority.

(3) Because the superimposed icons shows information indicating that overlapped sections exist, the user can tell that another weather information exists in the same section in addition to the weather information having the higher display priority.

Then, when the icon is touched, the weather information having the relatively lower display priority can be exclusively displayed. Specifically, every time the icon is touched, only corresponding sections are displayed sequentially in a descending order of the display priority of the weather information of the sections. In other words, even though regions of multiple weather information sets overlap with each other at the initial display state, each of the regions can be exclusively displayed in the descending order of the display priority of the weather information of each region every time the certain command is received. Thus, the above configuration facilitates visual recognition.

(4) In a case, where individual weather information is exclusively displayed from an initial display state, in which multiple information sets are overlapped with each other, the display is returned to the initial display state when time is out. As a result, without instruction by the user, the display is automatically returned to the initial display state when a certain period elapses. This provides convenience.

The map data input device 25 of the present embodiment corresponds to map information retrieving means of the present invention. The external communication device 24 of the present embodiment corresponds to weather information retrieving means. The display device 26 of the present embodiment corresponds to display means. The operation switch arrangement 22 and the like of the present embodiment correspond to a command receiving means. The touch sensitive panel of the present embodiment corresponds to detecting means of the command receiving means. The control circuit 29 of the present embodiment corresponds to display controlling means of the present invention.

Other Embodiment is described.

The one embodiment of the present invention has been described. However, an embodiment of the present invention is not limited to the above one embodiment. Thus, the present invention can be applied to any embodiment, provided that the any embodiment belongs to a technical area of the present invention.

(a) In the above one embodiment, the existence of the section, in which multiple weather information sets are overlapped with each other, is indicated by superimposing the icons on the section. However, the icons may not be superimposed on each other. Each of the multiple icons may be displayed under a display condition different from each other (for example, the icon of the higher priority may be displayed in a dark color, and the icon of the lower priority may be displayed in a light color).

(b) The icons may not be superimposed on each other. Instead, one of the icons may be displayed and "the number of the weather information" and "rank order of the display priority" may be displayed as a number within or in the vicinity of the one of the icons. For example, in a case, where four sets of weather information (four weather information sets) are overlapped with each other, the number of "1/4" is displayed along with the icon in the initial display state. When the region (sections) of the weather information of the second, third, or fourth display priority is required to be exclusively displayed, the number, "2/4", "3/4", or "4/4" may be respectively displayed along with the icon.

(c) The one embodiment describes that the portion that displays the icon is touched by the user such that the apparatus receives commands from the user. For example, mechanical switch operation may be alternatively employed for receiving the commands. Also, it is natural that the commands through sounds may be received alternatively.

(d) In the above embodiment, the navigation system 20 that is mounted on the vehicle has a function of a weather information display apparatus. However, for example, a mobile navigation system, which is portable, may be alternatively have the function of the weather information display apparatus. Alternatively, a portable terminal (e.g., cellular phone) that can be carried by a person may have the function of the weather information display apparatus. Further, for example, the function of the weather information display apparatus may be incorporated into a personal computer. The function can be provided as a computer program that runs on a computer system. The program may be stored in a computer readable storage medium, such as a magneto-optic disk, CD-ROM, DVD-ROM, a hard disk, a ROM, a RAM, and the above stored program may be loaded on the computer as necessary to achieve the function of each means.

Additional advantages and modifications will readily occur to those skilled in the art. The invention in its broader terms is therefore not limited to the specific details, representative apparatus, and illustrative examples shown and described.

What is claimed is:

1. A weather information display apparatus comprising:
   map information retrieving means for retrieving map information of a map;
   weather information retrieving means for retrieving a plurality of weather information sets, each of which is associated with at least one of sections of the map;
   display means for displaying information to a user;
   command receiving means for receiving a command from the user; and
   display controlling means for causing the display means to display the map based on the map information retrieved by the map information retrieving means, wherein:
   the plurality of weather information sets includes a first weather information set and a second weather information set;
   the first weather information set corresponds to a first region having one or more of the sections of the map;
   the second weather information set corresponds to a second region having one or more of the sections of the map;
   the display controlling means defines a first condition of the first region and a second condition of the second region such that the first region is displayed distinguishably from the second region;

the first condition indicates the first weather information set;

the second condition indicates the second weather information set;

each of the weather information sets has a predetermined display priority;

the first weather information set has the predetermined display priority higher than the predetermined display priority of the second weather information set;

when the first region partially overlaps with the second region via one or more overlapped sections which are included in both of the first and second regions, the display controlling means defines a condition of the one or more overlapped sections such that the one or more overlapped sections are displayed under the first condition, and the display controlling means causes the display means to display information that indicates an existence of the one or more overlapped sections; and when the display controlling means receives a certain command via the command receiving means, the display controlling means defines the condition of the one or more overlapped sections such that the one or more overlapped sections are temporarily displayed under the second condition;

wherein one of the following is satisfied; each of the sections of the map is defined by a latitude and a longitude; and each of the sections of the map is divided by a government.

2. The weather information display apparatus according claim 1, wherein:

the display controlling means defines the first and second conditions such that the first region is distinguishable from the second region, and the display controlling means simultaneously causes the display means to display a first icon indicative of the first weather information set and a second icon indicative of the second weather information set; and the display controlling means causes the display means to display the first icon and the second icon, which are superimposed on each other and displaced by a certain amount relatively from each other, when the display controlling means causes the display means to display the information that indicates the existence of the one or more overlapped sections.

3. The weather information display apparatus according to claim 2, wherein:

the command receiving means includes detecting means for detecting a contact by the user to a display surface of the display means; and the command receiving means receives the certain command when the detecting means detects that a part of the display surface, which part displays the first and second icons, is touched by the user.

4. The weather information display apparatus according to claim 1, wherein:

the plurality of weather information sets includes a third weather information set;

the third weather information set corresponds to a third region having one or more of the sections of the map;

the third weather information set has the predetermined display priority lower than that of the first weather information set;

in a case, where the third region partially overlaps with the first and second regions via the one or more overlapped sections which are included in the first, second and third regions, the display controlling means causes the display means to exclusively display the first region when the display controlling means receives the certain command via the command receiving means; and the display controlling means causes the display means to exclusively display each of the second and third regions sequentially in a descending order of the display priority of the weather information of the region every time the display controlling means receives the certain command via the command receiving means after the display controlling means has caused the display means to display the first region.

5. The weather information display apparatus according to claim 4, wherein:

when the display controlling means has not received the certain command via the command receiving means during a predetermined period after the condition is changed from an initial display state by receiving the certain command via the command receiving means, the display controlling means returns the condition to the initial display state.

6. The weather information display apparatus according to claim 1, wherein:

the first condition includes color or a texture pattern, by which the first region is displayed; and the second condition includes color or a texture pattern, by which the second region is displayed.

7. An article of manufacture comprising:

a computer non-transitory readable medium readable by a computer; and program instructions carried by the computer readable medium for causing the computer to serve as the display controlling means of the weather information display apparatus according to claim 1.

8. A weather information display apparatus comprising:

map information retrieving means for retrieving map information of a map;

weather information retrieving means for retrieving a plurality of weather information sets, each of which is associated with at least one of sections of the map;

display means for displaying information to a user;

command receiving means for receiving a command from the user; and display controlling means for causing the display means to display the map based on the map information retrieved by the map information retrieving means, wherein:

the plurality of weather information sets includes a first weather information set and a second weather information set;

the first weather information set corresponds to a first region having one or more of the sections of the map;

the second weather information set corresponds to a second region having one or more of the sections of the map;

the display controlling means defines a first condition of the first region and a second condition of the second region such that the first region is displayed distinguishably from the second region;

the first condition indicates the first weather information set;

the second condition indicates the second weather information set;

each of the weather information sets has a predetermined display priority;

the first weather information set has the predetermined display priority higher than the predetermined display priority of the second weather information set;

when the sections of the map include one or more overlapped sections which are included by the first and the second regions, the display controlling means defines a condition of the one or more overlapped sections such that the one or more overlapped sections are displayed under the first condition, and the display controlling means causes the display means to display information that indicates an existence of the one or more overlapped sections; and when the display controlling means receives a certain command via the command receiving means, the display controlling means defines the condition of the one or more overlapped sections such that the one or more overlapped sections are temporarily displayed under the second condition;

wherein one of the following is satisfied: each of the sections of the map is defined by a latitude and a longitude; and each of the sections of the map is divided by a government.

9. The weather information display apparatus according to claim 8, wherein:

the display controlling means defines the first and second conditions such that the first region is distinguishable from the second region, and the display controlling means simultaneously causes the display means to display a first icon indicative of the first weather information set and a second icon indicative of the second weather information set; and the display controlling means causes the display means to display the first icon and the second icon, which are superimposed on each other and displaced by a certain amount relatively from each other, when the display controlling means causes the display means to display the information that indicates the existence of the one or more overlapped sections.

10. The weather information display apparatus according to claim 9, wherein:

the command receiving means includes detecting means for detecting a contact by the user to a display surface of the display means; and the command receiving means receives the certain command when the detecting means detects that a part of the display surface, which part displays the first and second icons, is touched by the user.

11. The weather information display apparatus according to claim 8, wherein:

the plurality of weather information sets includes a third weather information set;

the third weather information set corresponds to a third region having one or more of the sections of the map;

the third weather information set has the predetermined display priority lower than that of the first weather information set;

in a case, where the third region further includes the one or more overlapped sections, the display controlling means causes the display means to exclusively display the first region when the display controlling means receives the certain command via the command receiving means; and the display controlling means causes the display means to sequentially display the one or more overlapped sections under the condition of each of the second one and the third one of the weather information sets in a descending order of the display priority of the weather information every time the display controlling means receives the certain command via the command receiving means after the display controlling means has caused the display means to display the one or more overlapped sections under the first condition.

12. The weather information display apparatus according to claim 11, wherein:

when the display controlling means has not received the certain command via the command receiving means during a predetermined period after the condition is changed from an initial display state by receiving the certain command via the command receiving means, the display controlling means returns the condition to the initial display state.

13. The weather information display apparatus according to claim 8, wherein:

the first condition includes color or a texture pattern, by which the first region is displayed; and the second condition includes color or a texture pattern, by which the second region is displayed.

14. An article of manufacture comprising:

a computer non-transitory readable medium readable by a computer; and program instructions carried by the computer readable medium for causing the computer to serve as the display controlling means of the weather information display apparatus according to claim 8.

* * * * *